US00RE36559E

United States Patent [19]

Fujiwara et al.

[11] E Patent Number: Re. 36,559

[45] Reissued Date of Patent: Feb. 8, 2000

[54] METHOD AND APPARATUS FOR ENCODING AUDIO SIGNALS DIVIDED INTO A PLURALITY OF FREQUENCY BANDS

[75] Inventors: Yoshihito Fujiwara; Tomoko Umezawa; Masayuki Nishiguchi, all of Kanagawa; Makoto Akune, Tokyo; Naoto Iwahashi; Kenzo Akagiri, both of Kanagawa, all of Japan

[73] Assignee: Sony Corporation, Tokyo, Japan

[21] Appl. No.: 08/245,451

[22] Filed: May 18, 1994

Related U.S. Patent Documents

Reissue of:

[64] Patent No.: 5,115,240
Issued: May 19, 1992
Appl. No.: 07/586,494
Filed: Sep. 21, 1990

[30] Foreign Application Priority Data

Sep. 26, 1989 [JP] Japan ..... 1-249835
Oct. 25, 1989 [JP] Japan ..... 1-278207

[51] Int. Cl.[7] ..... H03M 7/00

[52] U.S. Cl. ..... 341/51; 381/51

[58] Field of Search ..... 341/51

[56] References Cited

U.S. PATENT DOCUMENTS

| | | | |
|---|---|---|---|
| 3,349,183 | 10/1967 | Campanella | 179/15.55 |
| 4,184,049 | 1/1980 | Crochiere et al. | 179/1 SA |
| 4,285,014 | 8/1981 | Satoh | 560/22 |
| 4,516,241 | 5/1985 | Farah et al. | 370/110.1 |
| 4,535,472 | 8/1985 | Tomcik | 381/31 |
| 4,569,058 | 2/1986 | Grallert | 375/27 |
| 4,573,187 | 2/1986 | Bui et al. | 381/43 |

(List continued on next page.)

FOREIGN PATENT DOCUMENTS

| | | |
|---|---|---|
| 0 349 325 A2 | 1/1990 | European Pat. Off. . |
| 0411 730 A3 | 2/1991 | European Pat. Off. . |
| 0 423 050 A1 | 4/1991 | European Pat. Off. . |
| 0 446 031 A3 | 9/1991 | European Pat. Off. . |
| 0 458 645 A2 | 11/1991 | European Pat. Off. . |
| 0 463 473 A2 | 1/1992 | European Pat. Off. . |
| 0 466 190 A2 | 1/1992 | European Pat. Off. . |
| 0 473 367 A1 | 3/1992 | European Pat. Off. . |
| 0 506 394 A2 | 9/1992 | European Pat. Off. . |
| WO 90/09064 | 8/1990 | WIPO . |
| WO 91/16769 | 10/1991 | WIPO . |
| WO 92/17884 | 10/1992 | WIPO . |

OTHER PUBLICATIONS

"*Subband/Transform Coding Using Filter Bank Designs Based on Time Domain Aliasing Cancellation*", J.P. Princen, A.W. Johnson and A.B. Bradley, University of Surrey, Guildford, Surrey, Royal Melborne Institute of Technology, Melborne, 3001, Australia, pp. 2161–2164 (no date given).

"*Signal Compression: Technology Targets and Research Directions*", Nikil Jayant, 8272 IEEE Journal on Selected Areas in Communications, 10 (1992), Jun., No. 5, New York, U.S., pp. 796–810.

"*Perceptual Transform Coding of Wideband Stereo Signals*", James D. Johnson, AT&T Bell Laboratories, Murray Hill, New Jersey, 07974, 1989 IEEE, pp. 1993–1994 and 1996.

(List continued on next page.)

*Primary Examiner*—Brian Young
*Attorney, Agent, or Firm*—Limbach & Limbach L.L.P.

[57] ABSTRACT

This invention relates to a digital signal encoding apparatus in which the [width of the range in] *digital signal is divided into frequency components in plural frequency bands and the bandwidth of the frequency bands is* selected to be wider for [the] higher [frequency range] *frequencies* of the digital [signals divided into a plurality of regions] *signal* and in which the encoded signals are synthesized for the respective [ranges] *frequency bands* wherein encoding is controlled as a function of the output detecting the characteristics of the *frequency* components [of] *in* the [divided] frequency *bands* and the detection time interval is selected to be longer for the lower frequency *bands* to enable more efficient encoding to be performed as a function of the properties of input digital signals.

47 Claims, 8 Drawing Sheets

U.S. PATENT DOCUMENTS

| | | | |
|---|---|---|---|
| 4,851,906 | 7/1989 | Koga et al. | 358/133 |
| 4,622,598 | 11/1986 | Doi et al. | 360/22 |
| 4,625,286 | 11/1986 | Papamichalis et al. | 364/513.5 |
| 4,697,212 | 9/1987 | Osawa et al. | 360/48 |
| 4,706,265 | 11/1987 | Furukawa | 375/122 |
| 4,748,579 | 5/1988 | Zibman et al. | 364/726 |
| 4,873,589 | 10/1989 | Inazawa et al. | 360/53 |
| 4,882,754 | 11/1989 | Weaver et al. | 381/35 |
| 4,885,790 | 12/1989 | Mc Anlay et al. | 381/36 |
| 4,896,362 | 1/1990 | Veldhuis et al. | 381/30 |
| 4,903,301 | 2/1990 | Kondo et al. | 381/30 |
| 4,912,763 | 3/1990 | Galand et al. | 381/31 |
| 4,932,062 | 6/1990 | Hamilton | 381/43 |
| 4,949,383 | 8/1990 | Koh et al. | 381/31 |
| 5,016,107 | 5/1991 | Sasson et al. | 358/209 |
| 5,040,217 | 8/1991 | Brandenburg et al. | 381/47 |
| 5,150,387 | 9/1992 | Yoshikawa et al. | 375/122 |
| 5,159,611 | 10/1992 | Tomita et al. | 375/34 |
| 5,204,677 | 4/1993 | Akagiri et al. | 341/118 |
| 5,218,561 | 6/1993 | Iwadare | 364/725 |
| 5,222,189 | 6/1993 | Fielder | 395/2 |
| 5,241,603 | 8/1993 | Akagiri et al. | 381/37 |
| 5,243,588 | 9/1993 | Maeda et al. | 369/54 |
| 5,264,846 | 11/1993 | Oikawa | 341/76 |
| 5,268,685 | 12/1993 | Fujiwara | 341/76 |
| 5,285,476 | 2/1994 | Akagiri et al. | 375/25 |
| 5,294,925 | 3/1994 | Akagiri | 341/50 |
| 5,311,561 | 5/1994 | Akagiri | 375/122 |
| 5,381,143 | 1/1995 | Shimoyoshi et al. | 341/51 |
| 5,384,891 | 1/1995 | Asakawa et al. | 395/2.29 |
| 5,388,093 | 2/1995 | Yoshida et al. | 369/124 |
| 5,388,209 | 2/1995 | Akagiri | 395/2.38 |
| 5,406,428 | 4/1995 | Suzuki | 360/53 |
| 5,461,378 | 10/1995 | Shimoyoshi et al. | 341/51 |
| 5,471,558 | 11/1995 | Tsutsui | 395/2.28 |

OTHER PUBLICATIONS

"*An Application Specific DSP Chip Set for 100 MHZ Data Rates*", Surendar Magar, Shannon Shen, Garry Luikuo, Mike Fleming and Raul Aguilar, Honeywell, Signal Processing Technologies, Colorado Springs, CO 80906, ICASSP 88, vol. IV, 1988 International Conference on Acoustics, Speech and Signal Processing, Apr. 11–14, 1988, pp. 1989–1992.

"*The Critical Band Coder–Digital Encoding of Speech Signals Based on the Perceptual Requirements of the Auditory System*", Michael A. Kasner, M.I.T. Lincoln Laboratory, 1980 IEEE, pp. 327–331.

"*Polyphase Quadrature Filters–A New Subband Coding Technique*", Joseph A. Rothweiler, RCA Goverment Communications Systems, ICASSP 83, Boston, vol. 3 of 3, pp. 1280–1283 (no date given).

"*Application of Quadratue Mirror Filters to Split Band Coding Schemes*", D. Esteban and C. Galan, IBM Laboratory, 1977 IEEE International Conference on Acoustics, Speech & Signal Processing, pp. 191–195.

"*An Application–Specific FFT Processor*", 8029 Electrical Engineering, 60 (1988) Jun. No. 738, Woolwich, London, Great Britian, pp. 99–100 and 104–106.

METHOD AND APPARATUS FOR ENCODING AUDIO SIGNALS DIVIDED INTO A PLURALITY OF FREQUENCY BANDS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a digital signal encoding apparatus for encoding input digital signals.

2. Prior Art

As a technique of high efficiency encoding of *an* input [signals] *signal*, there are known [encoding] techniques *of encoding* by so-called bit allocation, according to which input signals are divided into plural channels on the time or frequency axis and certain numbers of bits are adaptively allocated to the respective channels (bit allocation). Among the above mentioned [encoding] techniques *of encoding* by bit allocation are so-called sub-band coding (SBC) in which [voice] *audio* signals on the time axis are divided into signals [of] *in* a plurality of frequency bands for encoding, [a] so-called adaptive transformation coding (ATC), in which [voice] audio signals on the time axis are transformed into signals on the frequency axis by orthogonal [transformation and the] *transformation. Then the* resulting signals are divided into signals [of] *in* a plurality of frequency bands for [adaptive] *adaptively* coding [for] each frequency [band and a] *band. Also known is* so-called adaptive bit allocation (APC-AB), which is a combination of the above mentioned SBC and [APC] *ATC*, and in which the [voice] *audio* signals on the time axis are divided into signals [of] *in* a plurality frequency bands and the signals [of] *in* the respective bands are converted into base band or low range signals, after which multiple order linear predictive analyses are performed [for] *to carry out ep* predictive coding.

[The sub-band] *Sub-band* coding, for example, [is] *may be* performed by [a] *the* circuit shown in FIG. 1. In this figure, digital g[voice] *audio* signals, supplied to an input terminal 110 of an encoder 130, are fed to frequency division filters $\mathbf{131}_1$ to $\mathbf{131}_n$, which may for example be mirror filters, such as quadrature mirror filters (QMFs), so as to be limited in the frequency range and be shifted [to lower frequency sides.] *downwards in frequency.* That is, in these frequency division filters $\mathbf{131}_1$ to $\mathbf{131}_n$ the input digital [voice] *audio* signals are divided into separate frequency bands by band-pass filters or BPFs and subsequently passed through low-pass filters so as to be shifted to the lower frequency sides by amounts corresponding to the center frequencies of the pass bands of the LPFs. The signals from the filters are then supplied to quantizers $\mathbf{134}_1$ to $\mathbf{134}_n$, respectively, to undergo down-sampling at a suitable sampling frequency. It is noted that a higher sampling frequency should be used for a broader frequency band. The signals [in which the data have been compressed] *resulting from compression* by requantization in this manner are outputted at terminal 138 by way of a multiplexer 136. The output signals are then transmitted over a transmission channel to a terminal 148 of a decoder 140 and thence to dequantizers $\mathbf{144}_1$ to $\mathbf{144}_n$ via demultiplexer 149 for decoding. The decoded signals are converted by frequency converters $\mathbf{142}_1$ to $\mathbf{142}_n$ into signals [of] *in* the frequency bands on the time axis and [adds] *are added* at a summing junction 146 so as to be outputted at a terminal 150 as the decoded [voice] *audio* signals.

In signal [data] compression by the encoder 130, [quantization bits are adaptively allocated] *quality is improved by adaptively allocating quantization bits* to the respective frequency bands [for minimizing] *to minimize* the effects of [noises] *noise* produced [on data compression of voice signals to improve the quality.] *as a result of compressing the audio signal.* The decoder 140 also acquires the bit allocation information by some means or other in performing the decoding.

The conventional practice for acquiring the bit allocation information has been to transmit the energy value information of each frequency band as side information in addition to the signals of the respective bands. In this case, the energy values of signals of the respective bands are computed at energy detection means $\mathbf{133}_1$ to $\mathbf{133}_n$, from the signals divided into the frequency bands by the frequency division filters $\mathbf{131}_1$ to $\mathbf{131}_n$ of the encoder [130 and,] *130. Then,* based on the computed values, the optimum numbers of bit allocation and the steps of quantization at the time of quantization of the signals of the respective bands are found [at a allocation-step] *by the bit allocation* computing unit 135. The results obtained [at] *by* the computing unit 135 are used for requantizing the signals of the respective bands at quantizers $\mathbf{134}_1$ to $\mathbf{134}_n$. The output signals, that is the auxiliary or side information from the allocation-step computing unit 135, are transmitted to [an allocation-step] *a bit allocation* computing unit 145 of the decoder 140, and the data from the unit 145 are transmitted to dequantizers $\mathbf{144}_1$ to $\mathbf{144}_n$ where [an inverse operation of] *an operation inverse to* that performed at the quantizers $\mathbf{134}_1$ to $\mathbf{134}_n$ is performed to perform signal decoding.

With the above described frequency division and coding, noise shaping or the like may be taken into account in keeping with human auditory characteristics, and more information may be allocated to those frequency bands in which the [voice] *audio* energies are concentrated or which contribute more to subjective [voice] *audio* quality, such as clarity. Signal quantization and dequantization for the respective frequency bands are performed with the allocated number of bits for reducing the extent of obstruction of hearing by the quantization [noises] *noise* to reduce the number of bits on the whole. The above mentioned frequency division and coding results in generation of quantization noises only in the frequency band concerned without affecting the remaining bands. Meanwhile, when the energy value information is transmitted as the auxiliary data, as described above, the energy values of the signals of the respective bands may advantageously be employed as the quantization step widths or normalization factors of the respective frequency band signals.

Should the frequency division and coding be applied to musical or voice signals, the frequency band division is usually performed in such a manner that, in order to suit to the frequency analysis capability of the human auditory sense, a narrower bandwidth and a broader bandwidth are selected for the low frequency range and the high frequency range, respectively.

However, with such a frequency band division, suited to the frequency analysis capability of the human auditory sense, if the definition of temporal analyses for the respective frequency bands, that is the time width as the unit of analyses along the time axis, should be the same, the size of the analytic block for each frequency range, that is the number of samples or data will differ from one frequency range to another because of the difference in the band widths of the frequency [bands, with the result] *bands. The result of this is* that the efficiency of the analytic processing and hence the encoding efficiency are lowered. On the other hand, the constant amplitude [period] *domain, i.e., the time for which an audio signal has a constant amplitude,* is thought to be longer and shorter for the low and high frequency signals, respectively, so that an efficient encoding consistent with the constant amplitude [period] *domain* cannot be performed.

OBJECT AND SUMMARY OF THE INVENTION

It is therefore an object of the present invention to provide a digital signal encoding apparatus in which, in encoding [voice] *audio* signals divided into a plurality of frequency bands to suit the frequency analysis capability of the human auditory sense, a more efficient encoding consistent with the properties of the [voice] *audio* signals may be achieved.

It is another object of the present invention to provide a digital signal encoding apparatus in which a higher power of frequency resolution is realized [for a low frequency range] *at lower frequencies* and a higher power of temporal resolution is achieved [for higher frequency range] *at higher frequencies* where *the* duration the constant amplitude [state] *domain* is shorter.

According to the present invention, there is provided a digital signal encoding apparatus in which the input digital [signals are] *signal is* divided into a plurality of frequency bands [which are so set that the bands with] higher frequencies will have broader bandwidths, and in which encoded signals are synthesized and outputted for each of [said] *the* frequency ranges, wherein the improvement resides in that properties of the frequency components of the frequency bands are detected *to provide a detection output* and encoding is controlled as a function of the detection output, and in that the detection time duration is selected to be longer for lower frequencies.

Thus, according to the present invention, the definition of anlyses along the time axis is changed as a function of the bandwidths of the respective frequency bands to realize an optimum time interval for analyses for each frequency band.

DESCRIPTION OF THE PREFERRED EMBODIMENTS

Figure 1:
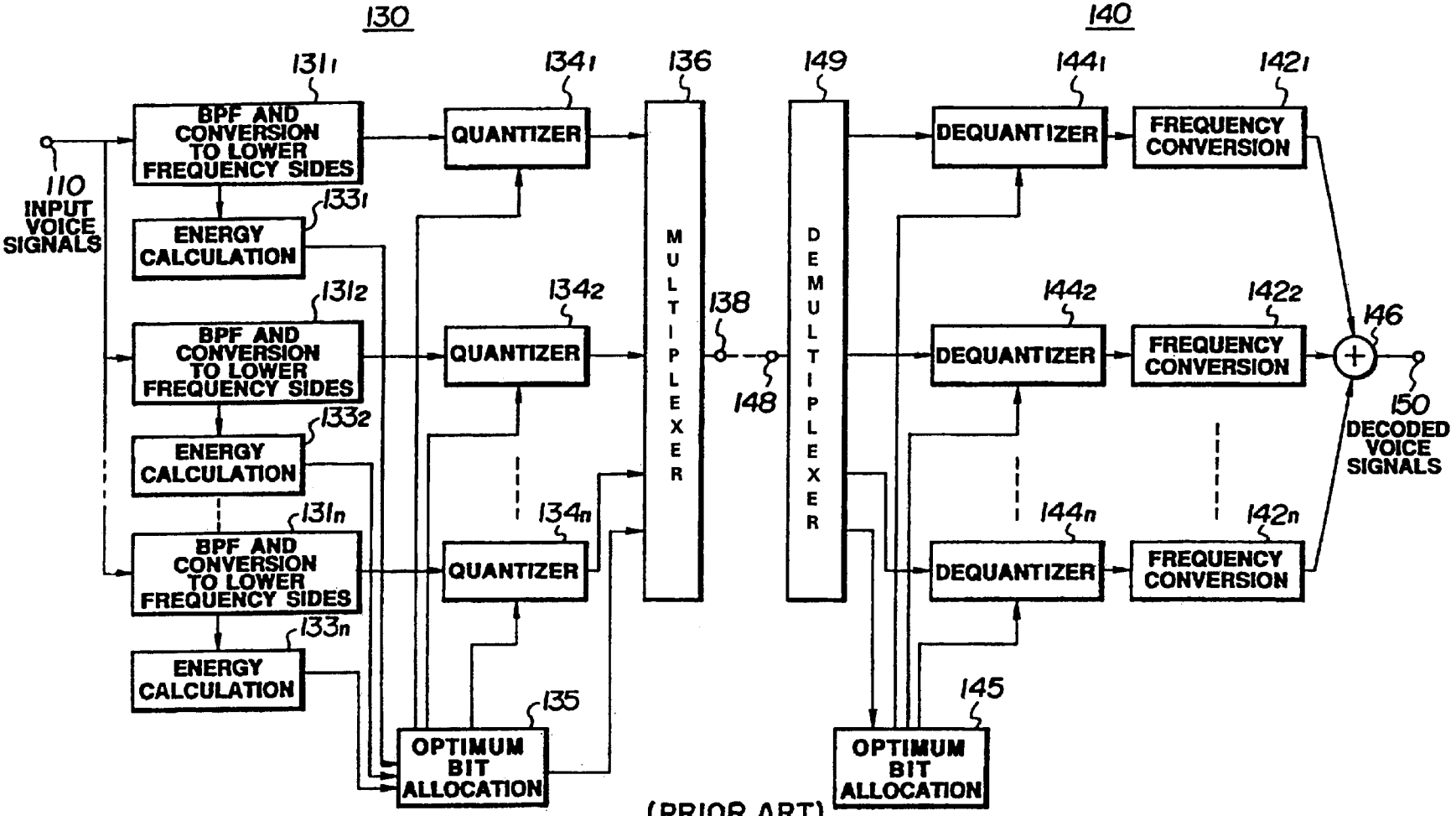
(PRIOR ART) FIG. 1
FIG. 1 is a block diagram showing an example of the conventional frequency division and encoding.

By referring to the drawings, certain preferred embodiments of the present invention will be explained in detail.

Figure 2:
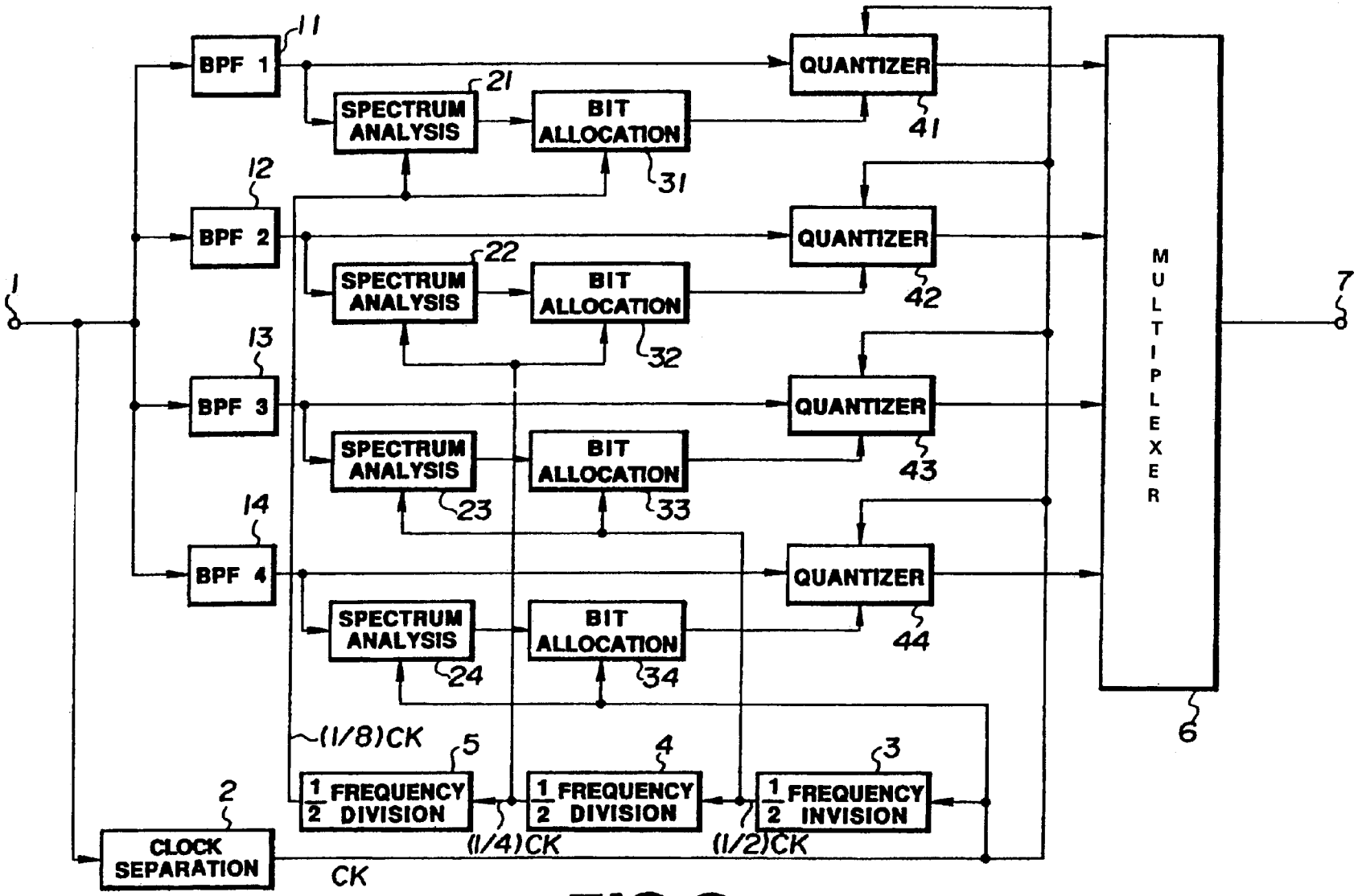
FIG. 2 is a block diagram showing a first embodiment of the present invention.
Figure 3:
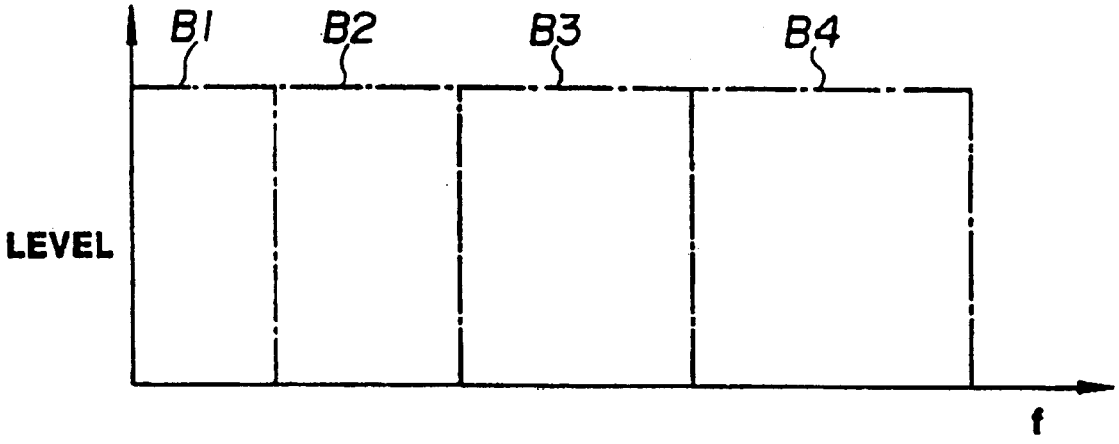
FIG. 3 is a diagrammatic view showing the operation of the embodiment of FIG. 2.

FIG. 2 shows diagrammatically the construction of a digital signal encoding apparatus according to a first embodiment of the present invention, wherein the frequency range is divided into four bands, as shown in FIG. 3.

In FIG. 2, [voice signals,] *an audio signal* for example, [are supplied as] *is supplied as an* input digital [signals] *signal* to an input terminal 1 of the digital signal encoding apparatus. [These voice signals are] *This audio signal is* first supplied to band-pass filters (BPFs) 11 to 14. These BPF filters divide the frequency range of the [voice signals] *audio signal* into a plurality of frequency bands so that the bandwidth will become broader for the higher frequency bands so as to suit the frequency discriminating capability of the human auditory sense. Low-pass filters are built in the BPFs 11 to 14 so that the signals are shifted [towards the low frequency sides] *downwards in frequency* by amounts corresponding to the [central] *center* frequencies of the pass bands of the BPFs 11 to 14.

The [voice signals,] *audio signal,* thus divided into plural frequency bands and shifted [to the lower frequency sides] *downwards in frequency* by the BPFs 11 to 14, [are] *is* divided into frequency bands B1, B2, B3 and B4 by the BPFs 11, 12, 13 and 14, as shown in FIG. 3. These frequency bands B1 to B4 are selected so that the bandwidths will be the broader, the higher the frequencies, as mentioned previously.

The signals of the respective frequency bands are quantized by quantizers 41 to 44. During such quantization, the frequency characteristics of the frequency components [of] *in* the respective bands are detected by spectrum analysis circuits 21 to 24, respectively; and quantization is controlled as a function of the detected output. That is, with the present encoding apparatus, the numbers of allocated bits at the time of quantization are determined on the basis of the results of the signal spectral analyses for the respective frequency bands, and quantization [at] *by* the quantizers 41 to 44 is performed on the basis of the so determined numbers of bit allocation.

Thus the signals of the respective frequency bands from the BPFs 11 to 14 are transmitted to spectrum analysis circuits 21 to 24, respectively, where spectral analyses for the [refractive] *respective* frequency bands are performed. The results of the analyses are transmitted to bit allocation [numbers] *number* decision circuits 31 to 34 which allocate the number of the bits at the time of quantization, so that the bit allocation numbers are determined [at] *by* the circuits 31 to 34 on the basis of the results of the analyses. Quantization [at] *by* the quantizers 41 to 44 [are] *is* performed on the basis of the so determined bit allocation numbers. [Quantization] *The quantized* outputs of the quantizers 41 to 44 are synthesized by a multiplexer 6 so as to be outputted at an output terminal 7 of the digital signal encoding apparatus of the present embodiment.

It is noted that, in quantizing the [voice signals] *audio signal* previously divided into plural frequency bands to suit the frequency analysis capability of the human auditory sense, since the bandwidths of the respective frequency bands differ from one frequency band to another, the block sizes of the spectral analyses, that is the widths along the time axis of the analytic blocks, will differ from one frequency band to another for the same assumed precision in definition of the analyses along time axis of the frequency [bands, with the result that] *bands. As a result,* the efficiency of spectral analyses, and hence the quantization efficiency, [are] *is* lowered. Since it is thought in general that the constant amplitude domain of [the low frequency range signal] *lower frequency signals* is longer and that of [the high frequency range signal] *higher frequency signals* is shorter, an efficient coding taking [such] *into account this* difference in the length of the constant amplitude domain cannot be realized.

With this in view, the temporal analytic accuracy, that is, the analytic accuracy along the time axis, is selected to be higher and lower for the high and low frequency range, respectively, for realizing a more efficient quantization. In other words, the durations of the spectral analyses are selected to be shorter and longer for the high and low frequency ranges, respectively.

That is, [for] *in the* spectral analyses *performed* by the spectral analysis circuits 21 to 24, the period of the analyses, which is the detection time interval or the time width as a unit of the analyses along the time axis, is selected to be the longer, the lower the frequency. Selection of the detection time intervals for *the* spectral analyses as a function of the frequencies may be made on the basis of each of the clock signals obtained [upon] *by* dividing the clock frequency of the clock [signals] *signal* contained in the [voice signals.] *audio signal.*

Thus, in the present embodiment, the clock signal [components in the voice signals] *in the audio signal* supplied to the input terminal 1 [are] *is* separated in a clock circuit 2. The so separated clock [signals CK are] *signal CK is* sequentially transmitted through ½ frequency dividers 3, 4 and 5 to produce frequency-divided clock [signals] *signal* (½) CK, divided to one half the original clock frequency CK, frequency-divided clock [signals] *signal* (¼) CK, divided to one-fourth the original clock frequency CK and frequency-divided clock [signals] *signal* (1/8) CK, divided to one-eighth the original clock frequency CK. Of the so-produced clock signals, the clock [signals CK are] *signal CK is* transmitted to a spectrum analysis circuit 24 and a bit allocation number decision circuit 34, the frequency-divided clock [signals] *signal* (½) CK [are] *is* transmitted to a spectrum analysis circuit 23 and a bit allocation number decision circuit 33, the frequency-divided clock [signals (¼) CK are] *signal (¼) CK is* transmitted to a spectrum analysis circuit 22 and a bit allocation number decision circuit 32 and the frequency-divided clock [signals (1/8) CK are] *signal (1/8) CK is* transmitted to a spectrum analysis circuit 21 and a bit allocation number decision circuit 31.

[Hence] *Consequently*, the detection time duration of the spectral analyses, that is, the unit time width for the analyses, [becomes] *is a* maximum at the spectrum analysis circuit 21, [while it becomes] *is* progressively shorter at the spectrum analysis circuits 22 and 23, [becoming] *and is* shortest at the spectrum analysis circuit 24.

By changing the detection time intervals for spectral analyses in this manner, it becomes possible to [realize] *perform* efficient spectral analyses and hence efficient quantization at the time of quantizing the [voice signals] *audio signal* divided into a plurality of frequency bands to suit the frequency analysis capability of the human auditory sense. With the detection time interval thus changed, the spectrum for each frequency band may be thought to be constant in each block of the band, so that the values of the spectrum analyses for the long-time block may be used in the lower frequency range in substitution for the short-time spectral waveform.

[Meanwhile, the] *The* division ratio of the frequency range need not necessarily be inversely [proportionate] *proportional* to the time durations for spectrum analyses, that is the time durations bearing the ratios of 8:4:2:1 to the [frequency] *period* of the clock signals CK. However, the relative magnitude of the division ratio is preferably selected in the above described manner. Such relative magnitude is in keeping with the direction in which the block size of the spectral analyses, that is the width of the analytic block along the time axis, may be made the same, so that the efficiency is not lowered.

Although the bit allocation numbers for quantization are determined in the above embodiment by the spectral analyses, the bit allocation numbers for quantization may also be determined using *the* floating coefficients [for] *of* a so-called block floating operation.

Figure 4:
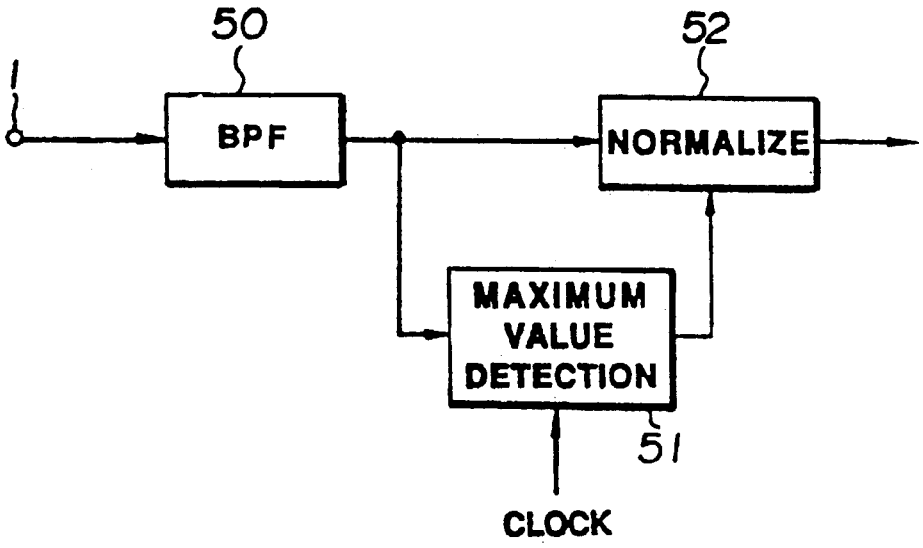
FIG. 4 is a block diagram for illustrating a modified quantization system.

FIG. 4 shows a portion of the digital signal encoding apparatus of the present embodiment responsible for only one frequency band.

In this figure, [voice signals] *the audio signal* at an input terminal 1 [are] *is* passed through a band-pass filter (BPF) 50 where [the signals of] *components of the audio signal in* a predetermined frequency band are [taken out] *extracted* as a block which is then transmitted to a maximum value detection circuit 51 adapted for detecting the maximum value [data] *of the samples* in the block. In this maximum value detection circuit 51, the maximum value [data] *sample* in the block is detected, and the floating coefficient for the block floating operation is found on the basis of the maximum value [data] *sample.*

In detecting the floating coefficient, if the same degree of accuracy is used for *the* temporal analyses of the respective frequency bands, the efficiency of detection of the floating coefficients and hence the quantization efficiency tends to be lowered, while it is not possible to perform efficient encoding in accordance with the constant-amplitude domains.

Thus the maximum value detection circuit 51 is fed with the frequency-divided clock signals shown in FIG. 2 and the precision of definition along the time axis of the floating coefficient or the analysis time interval of the floating coefficient is determined on the basis of these frequency-divided clock signals. That is, in the present embodiment, the precision of definition along the time axis is selected to be higher and lower for the high and low frequencies, respectively, for realizing more efficient quantization.

The floating coefficients, for which the time intervals for analyses have been determined in this manner, are transmitted to a normalization circuit 52. The aforementioned block [data are] *of samples is* also supplied to the normalization circuit 52, so that the block [data are] *of samples is* processed in the normalization circuit 52 by block floating on the basis of the above mentioned floating coefficients, and the blocks thus processed by block floating are quantized subsequently.

Since the block floating also is preferably performed in the constant-amplitude [signal domain,] *domain of the signal,* the time interval of the floating coefficient for the constant-amplitude [signal] domain is selected to be longer for the low frequency range where the constant-amplitude domain is longer for realizing efficient block floating.

That is, in the above described first embodiment of the digital signal encoding apparatus of the present invention, encoding is controlled in accordance with the detection output of the characteristics of the components of the frequency bands, while the detection time interval is selected to be longer for the lower frequencies, with the result that the detection efficiency is not lowered and hence efficient encoding suited to the nature of the input digital signals may be achieved.

A second embodiment of the present invention will be hereinafter explained by referring to FIG. 5, et seq.

Figure 5:
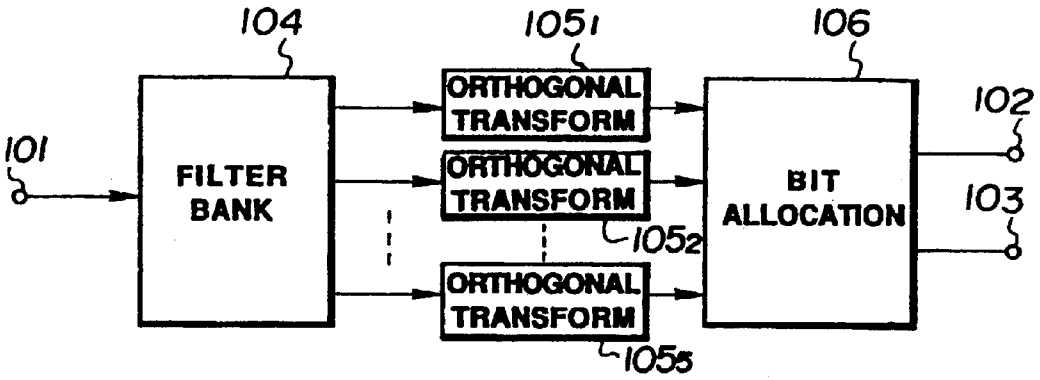
FIG. 5 is a block diagram showing a second embodiment of the present invention.

FIG. 5 shows diagrammatically a typical construction of a high efficiency encoding apparatus for digital data according to the second embodiment.

Referring to FIG. 5, the high efficiency encoding apparatus for [digital data] *a digital signal* according to the present embodiment is constituted by a filter bank 104, made up of mirror filters, such as quadrature mirror filters, as the frequency division filters, orthogonal transform circuits $\mathbf{105}_1$ to $\mathbf{105}_5$ for performing an orthogonal transform, that is a transform of the [time axis into] *the digital signal on the time axis to* the frequency axis, such as fast Fourier transform, and a bit allocation number decision circuit 106 for determining the bit numbers allocated to the respective frequency bands.

Figure 6:
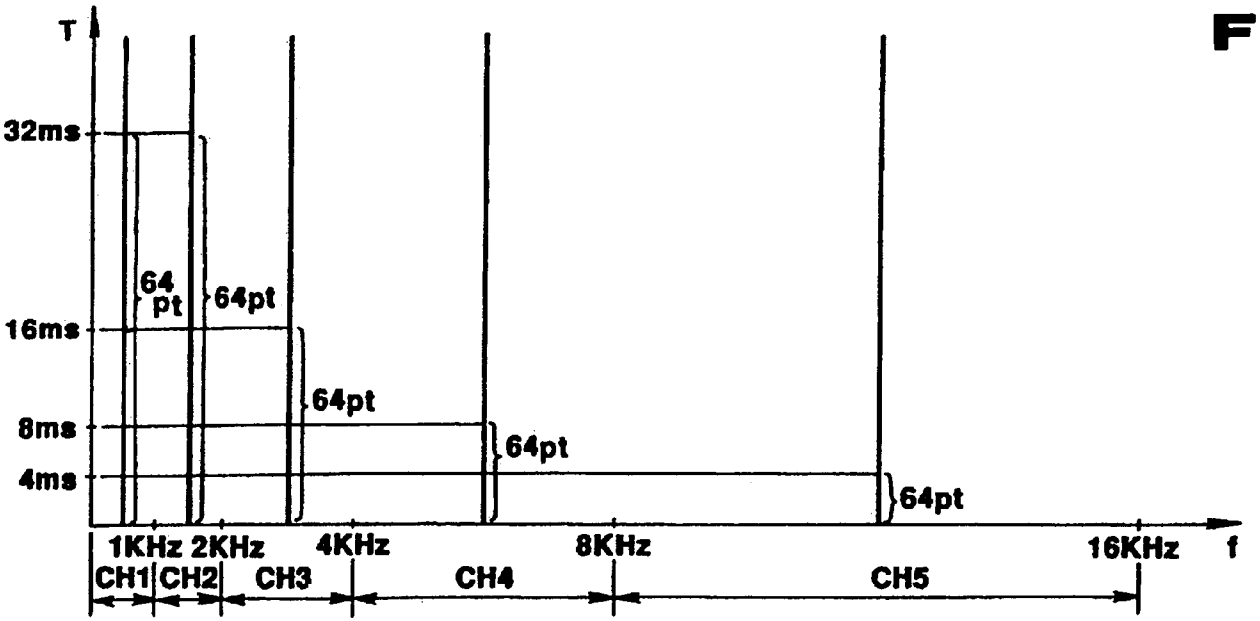
FIG. 6 is a diagrammatic view for illustrating the operation of the second embodiment shown in FIG. 5.

To the input terminal 101 [are supplied] *is supplied a* 0 to 16 kHz input digital [data] *signal* obtained upon sampling [audio signals] *an audio signal* with a sampling frequency fs=32 kHz. [These input data are] *The input digital signal is* transmitted to the filter bank 104, by means of which the [input data are] *input digital signal is* divided into a plurality n of, herein five, frequency bands [so that the bandwidths become] *that have bandwidths that are* broader [for] *towards* higher frequencies. Thus the input digital [data are] *signal is* divided roughly into five channels, that is a channel CH1 with the frequency band of 0 to 1 kHz, a channel CH2 with the frequency band of 1 to 2 kHz, a channel CH3 with the frequency band of 2 to 4 kHz, a channel CH4 with the frequency band of 4 to 8 kHz and a channel CH5 with the frequency band of 8 to 16 kHz, as shown in FIG. 6. Such frequency division in which the bandwidth [becomes broader for] *is broader towards* higher frequencies is a frequency division technique taking human auditory characteristics into account, [similarly] *similar* to the so-called critical band. The critical band, which takes the human auditory characteristics into account, means the band occupied by a narrow band noise masking a pure tone or sound, wherein the noise has the same amplitude as and [encompassing the level or] *encompasses the* pitch of the pure tone or sound, wherein, the higher the frequency, the broader becomes the bandwidth of the critical band. For each of these five channels, blocks each consisting of a plurality of [samples,] *samples of the input digital signal,* that is a unit time block, are formed by the orthogonal transform circuits $\mathbf{105}_1$ to $\mathbf{105}_5$ and orthogonal transform, such as a fast Fourier transform, is performed [for] *on* each unit time block of each channel to produce coefficient data [by] *as a result of* the orthogonal transform, such as the FFT coefficient data for FFT. The coefficient data of the respective channels are transmitted to the bit allocation number decision circuit 106, where the bit allocation number data for the respective channels are [formed] *determined* and the coefficient data for the respective channels are quantized. The encoder output is outputted at an output terminal 102, while the bit allocation number data are outputted at an output terminal 103.

In this manner, by constituting the unit time blocks from channel [data] *signals* having broader bandwidths for higher frequencies, the number of samples in the unit time block [becomes smaller for] *is smaller in* the low frequency channels of narrower [bandwidths, while becoming larger for] *bandwidths than in* the high frequency channels or broader bandwidths. In other words, the frequency resolution becomes lower and higher for the low and high frequency regions, respectively. By performing orthogonal transformation of each of the time blocks of the respective channels, the coefficient data [by] *resulting from* the orthogonal transformation may be obtained [at] *in* each channel over the full frequency range at an equal interval on the frequency axis, so that the same [high] frequency resolution may be realized at both [the high and low frequency sides] *high and low frequencies*.

If the human auditory characteristics are considered, [while] the frequency resolution [power] needs to be high [in the low frequency range, it] *at lower frequencies, but* need not be so high [in the high frequency range] *at higher frequencies*. For this reason, with the present embodiments, the unit time block [in] *on* which the orthogonal transform is performed is composed of the same number of [sample data for] *samples in* each band or channel. In other words, the unit time block has different block lengths from one channel to another, in such a manner that the low [range has] *frequency channels have* a longer block length and the high [range has] *frequency channels have* a shorter block length. That is, [the power of] *a high* frequency resolution is maintained at [a higher value for the lower frequency range while it is set] *lower frequencies while the frequency resolution is reduced* so as not to be higher than is necessary [for the higher frequency range] *at higher frequencies* and the [power of] temporal resolution is set to be high [for the higher frequency range] *at higher frequencies*.

It is noted that, with the present embodiment, the blocks with the same number of samples are subjected to [orthogonal transform for] *the orthogonal transform in* channels CH1 to CH5, so that the same number of coefficient data, such as 6-point (pt) coefficient data may be obtained in the respective channels. In this case, the channel block length is 32 ms for channel CH1, 32 ms for channel CH2, 16 ms for channel CH3, 1 ms for channel CH4 and 4 ms for channel CH5. If the fast Fourier transform is performed [by way of] *as* the aforementioned orthogonal transform, the amount of processing is 64 $\log_2$ 64 for channels CH1 and CH2, 64 $\log_2$ 64×2 for channel CH3, 64 $\log_2$ 64×4 for channel CH4 and 64 $\log_2$ 64×8 for channel CH5, in the example of FIG. 6. In case of the fast Fourier transform for the full frequency range, the amount of processing is 1024 $\log_2$ 1024=1024×10 for the sampling frequency fs=32 kHz and the coefficient data is 1024 pt for the block length equal to 32 ms.

Figure 9:
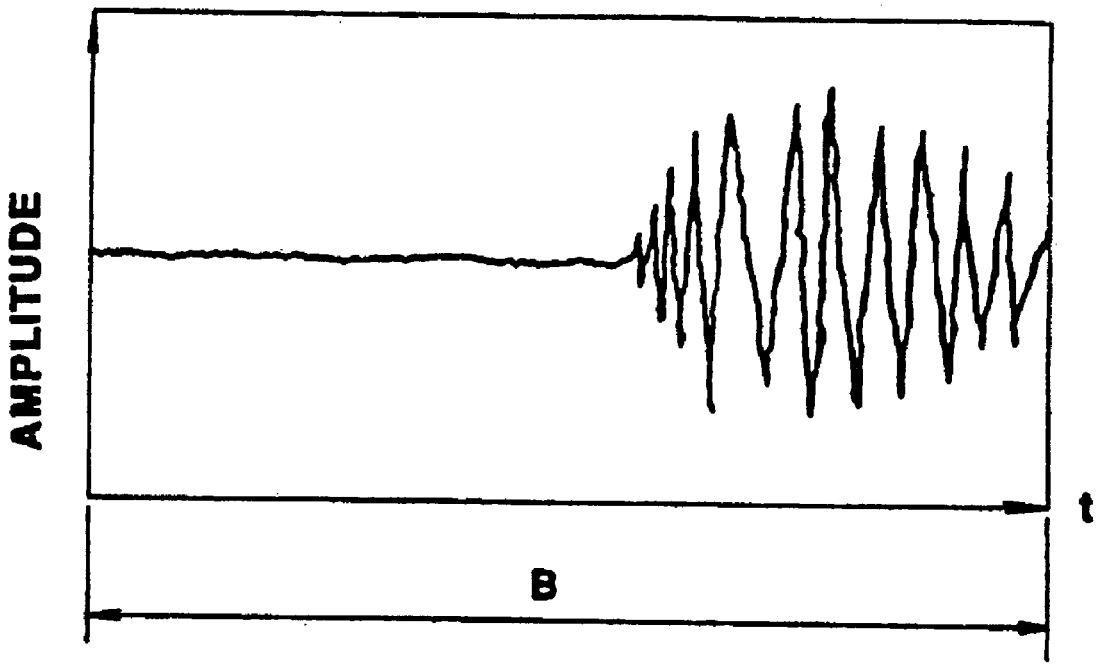
FIGS. 9 and 10 are charts for illustrating the operation of the embodiment shown in FIG. 5.
Figure 10:
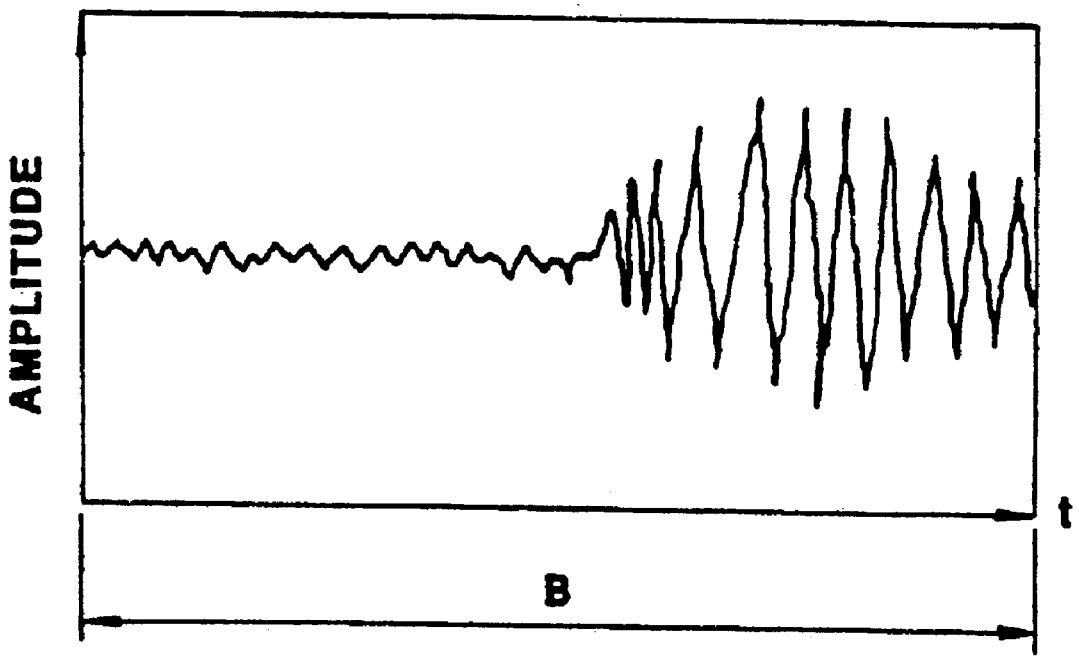

With the above described construction of the present embodiment, a high [power of] frequency resolution may be obtained at [the low frequency range] *lower frequencies* which is critical for the human auditory sense, while the requirement for [a] *the* higher temporal resolution necessary [with] *for* transient signals rich in high frequency components as shown in FIG. 9 may also be satisfied. The filter bank, the orthogonal transform circuits [or] *and* the like may be those used conventionally so that the construction may be simplified and reduced in costs and the delay time in each circuit of the apparatus may be diminished.

Figure 7:
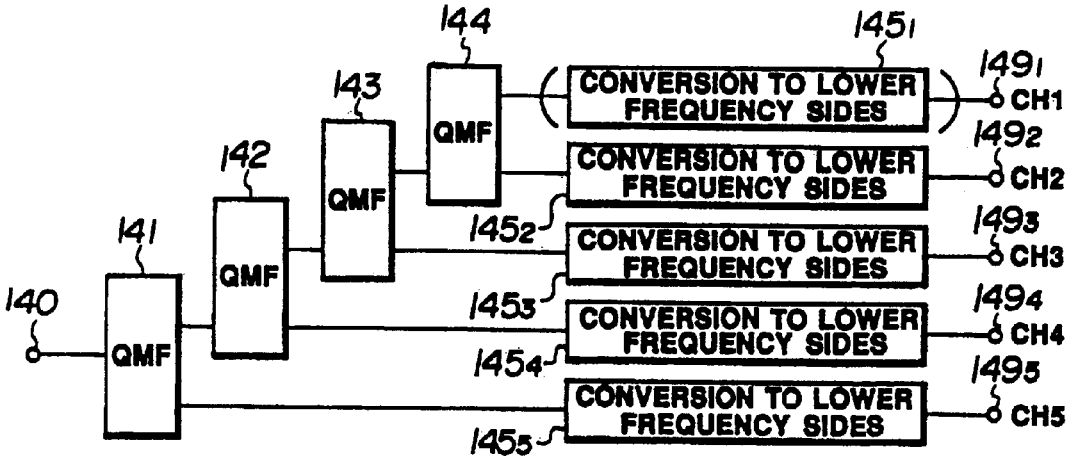
FIG. 7 is a block diagram showing the filter bank of FIG. 5 in detail.

FIG. 7 shows the [concrete] *practical* construction of the filter bank 104. In this figure, the 0 to 16 kHz input digital [data] *signal* with the sampling frequency fs=32 kHz is supplied to an input terminal 140 of the filter bank 104. [These] *This* input digital [data are] *signal is* first supplied to a [filter] QMF *filter* 141 where the 0 to 16 kHz input digital data are divided into 0 to 8 kHz output data and 8 to 16 kHz output data, of which the 8 to 16 kHz output data are supplied to a low range conversion circuit $\mathbf{145}_5$. The 8 to 16 kHz data undergo down-sampling in the low range conversion circuit $\mathbf{145}_5$ to generate 0 to 8 kHz data, which are outputted at output terminal $\mathbf{149}_5$. The 0 to 8 kHz output from QMF 141 is transmitted to a filter QMF 142, where it is similarly divided into a 4 to 9 kHz output transmitted to a low range conversion circuit $\mathbf{145}_4$ and a 0 to 4 kHz output transmitted to a QMF 143. The 0 to 4 kHz [data] *signal*, converted into [the base band data, are] *a base band signal is* obtained at the low range conversion circuit $\mathbf{145}_4$ so as to be outputted at output terminal $\mathbf{149}_4$. Similarly, a 0 to 2 kHz output and a 2 to 4 kHz output are produced at [filter] QMF *filter* 143, while a 0 to 1 kHz output and a 1 to 2 kHz output are produced at [filter] QMF *filter* 144, so as to be converted into low range signals in low range conversion circuits $\mathbf{145}_3$ to $\mathbf{145}_1$ before being outputted at output terminals $\mathbf{149}_3$ to $\mathbf{149}_1$. These outputs are transmitted via channels CH1 to CH5 to the orthogonal transform circuits $\mathbf{105}_1$ to [$\mathbf{105}_5$, meanwhile, the] $105_5$. *The* low frequency conversion circuit $\mathbf{145}_1$ may be omitted if so desired.

Figure 8:
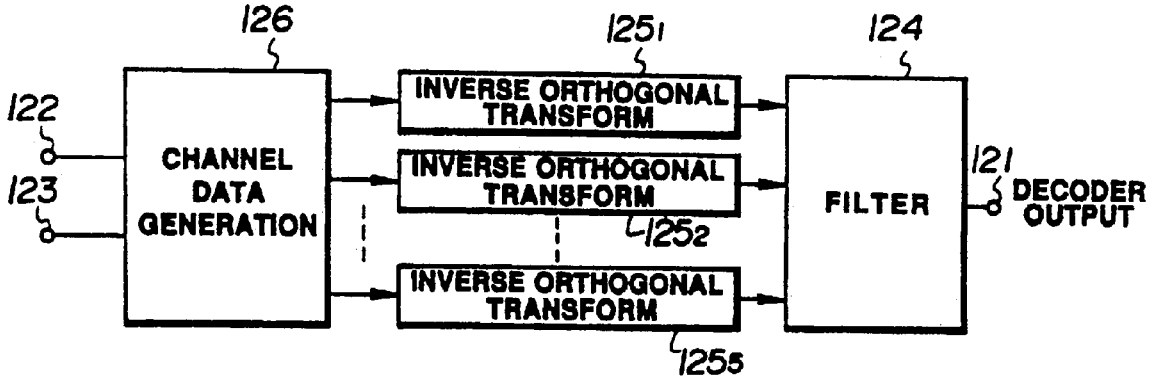
FIG. 8 is a block diagram showing a decoder corresponding to the embodiment of FIG. 5.

FIG. 8 shows the construction of a decoder. In this figure, the above mentioned encoder output is supplied to an input terminal 122, while the above mentioned bit allocation number information is supplied to an input terminal 123. These [data] *signals* are supplied to a channel information generator 126 where the [data of] *signal from* the encoder output [are restored into] *is dequantized to restore the* coefficient data of the respective channels on the basis of the bit allocation number information. These restored coefficient data are transmitted to inverse orthogonal conversion circuits $\mathbf{125}_1$ to $\mathbf{125}_5$ where an [inverse] operation *inverse* to that in the orthogonal conversion circuits $\mathbf{105}_1$ to $\mathbf{105}_5$ is performed [to produce data in which] *in which the coefficient data on* the frequency axis is converted into *samples of a signal on* the time axis. The [data of] *samples* the respective channels on the time axis are decoded by a synthesis filter 124 before being outputted as the decoder output *signal* at output terminal 121.

In [forming] *determining* the bit allocation information for each channel in the bit allocation number decision circuit 106 of FIG. 5, the allowable signal noise level is [set] *calculated* and the masking effect is taken into consideration at this time so that the allowable noise level will be higher for the higher band frequency for the same energy value for determining the allocation bit number for each band. The masking effect means both the masking effect for signals on the time axis and that for signals on the frequency axis. That is, [by such] *according to the* masking effect, any noise [in the masked signals, if any, may] *that is masked by a signal will* not be heard. Hence, in [the] actual audio signals, any [noises in the masked] *noise masked by* signals on the frequency axis [are allowable noises] *is allowable noise*, so that, during quantization of the [audio] *coefficient* data, it becomes possible to diminish the number of the allocated bits corresponding to the allowable noise level.

In the above described second embodiment of the high efficiency encoder for [digital data,] *an input digital signal,* the input digital [data are] *signal is* divided into a plurality of bands [so that the bandwidth will become broader for the higher frequency range,] *that have bandwidths that are broader towards higher frequencies,* blocks each consisting of a plurality of samples are formed for each band and orthogonal transform is performed for each of the blocks so as to produce the coefficient data to realize encoding with a higher frequency resolution [power]. The orthogonal transform block consists of the same number of [sample data for] *samples in* each band, so that [a high power of] *the high* frequency resolution required for the lower [frequency range] *frequencies* may be realized, while the requirement for a high [power of] temporal resolution for transient signals rich in high frequency components may also be satisfied.

In this manner a highly efficient encoding consistent with the human auditory characteristics may be achieved. The construction for implementing the encoder of the present embodiment may be simple and inexpensive since the components may be those used conventionally.

Figure 11:
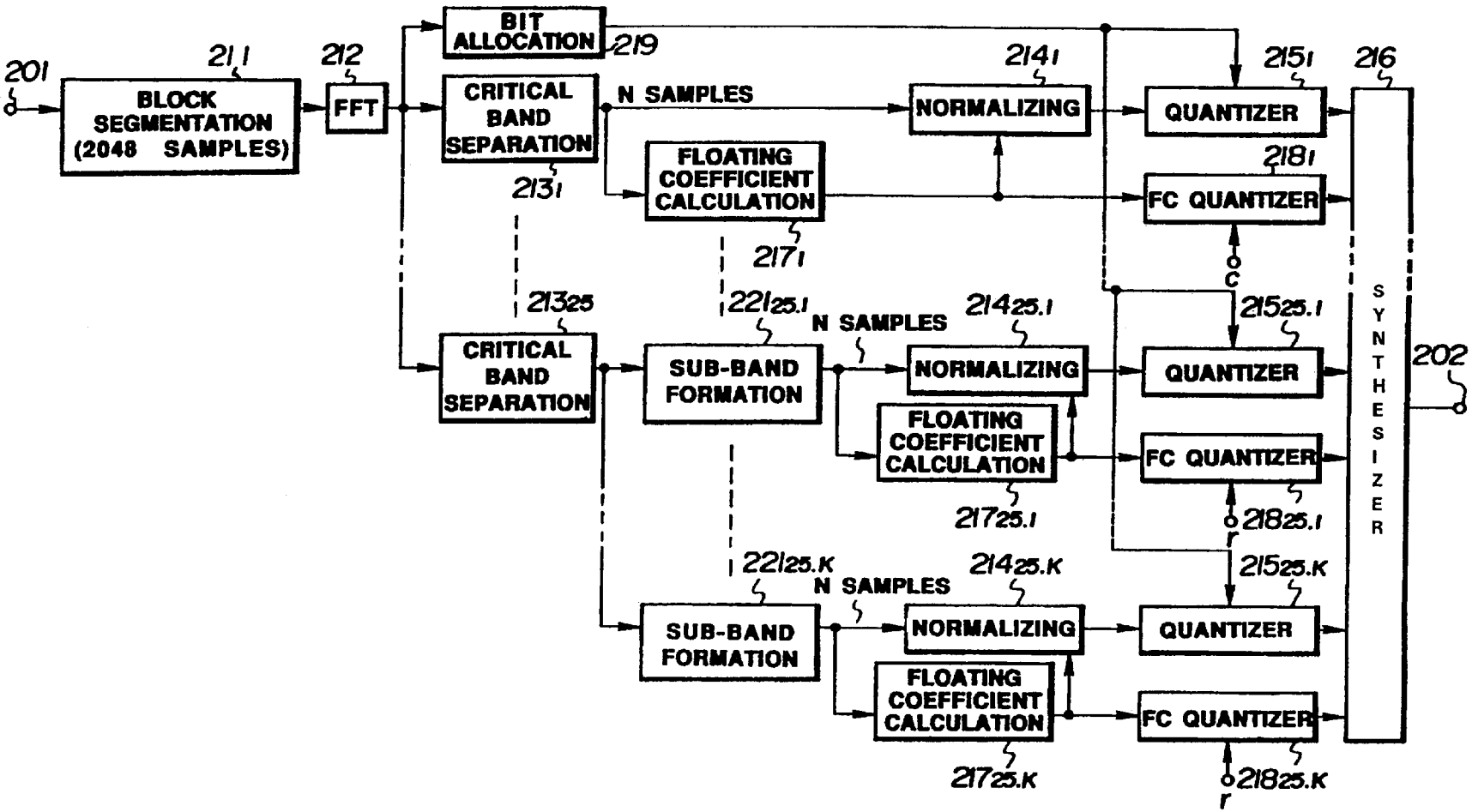
FIG. 11 is a block diagram showing a third embodiment of the present invention.

A third embodiment of the present invention will be hereinafter explained by referring to FIG. 11 showing, as a typical example of high efficiency encoding, a high efficiency encoder in which the above mentioned adaptive transform coding is applied.

In FIG. 11, the input digital [data are] *signal is* transmitted via input terminal 201 to a block forming circuit 211 where [they are] *it is* formed into blocks [at] *of* a predetermined time [interval] *duration* before being transmitted to a fast Fourier transform (FFT) circuit 212. In this FFT circuit 212, the [data in the form of unit time blocks] *unit time blocks of the input digital signal* are converted into *coefficient* data on the frequency axis. Assuming that the FFT operation for 2048 samples is to be performed, the FFT coefficient data expressed by the phase angle of 1023 points and the amplitude point of 1025 points (or the imaginary number part of 1023 points and the real number part of 1025 points), may be found. These FFT coefficient data are transmitted to critical band separation circuits $\mathbf{213}_1$ to $\mathbf{213}_{25}$ where they are divided into, for example 25 critical bands so as to be formed into blocks.

Since the band or block width *of the critical bands* becomes progressively broader [for the higher frequency range,] *towards higher frequencies,* the number of [samples in one block becomes larger for the higher frequency range than for the lower frequency range] *coefficient data in each band is larger at higher frequencies than at lower frequencies.* In such case, the efficiency of block floating [for the higher frequency range,] *applied to the higher-frequency bands,* which will be explained subsequently, [becomes lower.] *is reduced.*

Thus, with the present embodiment, an approximately equal number of [samples of the] *coefficient* data [of] *in* the respective bands are collected and arranged into a block form. That is, the numbers of *coefficient* data in the blocks are approximately equal. For example, [sample] *N coefficient data* (FFT coefficient data) are collected along the frequency axis into one block. Referring to the signal path downstream of the critical band separation circuit $\mathbf{213}_1$, [samples] *N coefficient data* (one block) are outputted from the critical band separating circuit $\mathbf{213}_1$. This block is transmitted to the normalization circuit $\mathbf{214}_1$, while also being transmitted to a floating coefficient computing circuit $\mathbf{217}_1$. In the computing circuit $\mathbf{217}_1$, the floating coefficient is computed and transmitted to the normalization circuit $\mathbf{214}_1$, where the floating operation for the block is performed with the use of the floating coefficient for normalization. The output of the normalization circuit $\mathbf{214}_1$ is transmitted to the quantization circuit $\mathbf{251}_1$ for quantizing the normalized block. The quantization is performed on the basis of the bit number information from a bit allocation number decision circuit 219 determining the number of the bits allocated to the respective critical bands. The output from the quantizer $\mathbf{215}_1$ is supplied to a synthesizer 216. The floating coefficient is quantized in a floating coefficient quantization (FC quantization) circuit $\mathbf{218}_1$, with a predetermined number of bits c for each block as a unit, before being transmitted to the [synthesizer] *multiplexer* 216. The quantization outputs from the block and the quantization output of the floating coefficient are [synthesized in the synthesizer] *multiplexed in the multiplexer* 216 so as to be outputted at an output terminal 202.

It is noted that, for maintaining *the efficiency of* the block floating operation at [the higher frequency range] *higher*

*frequencies* and achieving effective bit allocation which takes human auditory characteristics into account, the FC quantization circuit is adapted to perform quantization with [or] *a* number of bits which is [the lesser] *less* the higher the frequency of the floating coefficient. That is, with the present high efficiency encoding apparatus, *k* blocks each consisting of *N* consecutive [samples] *coefficient data* are generated from each band [for the high frequency range having] *at higher frequencies where the bands have* a broader band width and [a large number of samples,] *include a larger number of coefficient data,* wherein k denotes a natural number which differs from one band to another. Taking [an] *the* output of the critical band separating circuit $\mathbf{213}_{25}$ of the high frequency range as an example, the output of the critical band separating circuit $\mathbf{213}_{25}$ is transmitted to *k* sub-band forming circuits $\mathbf{221}_{25,1}$ to $\mathbf{221}_{25,k}$ from which the blocks are consisting of *N* consecutive [samples] *coefficient data* are generated. These blocks are processed by the normalization circuits $\mathbf{214}_{25,1}$ to $\mathbf{214}_{25,k}$, floating coefficient computing circuits $\mathbf{217}_{25,1}$ to $217_{25,k}$, quantization circuits $\mathbf{215}_{25,1}$ to $\mathbf{215}_{25,k}$ and by the FC quantization circuits $\mathbf{218}_{25,1}$ to $\mathbf{218}_{25,k}$, similar to those downstream of the critical band separating circuits $\mathbf{214}_{25,1}$ to $\mathbf{214}_{25,k}$ before being transmitted to the synthesize 216.

[At this time, in] *In* the FC quantization circuits $\mathbf{218}_{25,1}$ to $\mathbf{218}_{25,k}$, the floating coefficients [have been quantized on the block-by-block basis] *are quantized block-by-block* with the number of bits r [lesser] *which is less* than the predetermined number of bits c [at] *used by* the FC quantization circuit 218, (c>r). [Meanwhile, the] *The* numbers of [samples N of] *coefficient data N in* the respective [bands] *blocks* are provided so as to be uniform to some extent.

Figure 12:
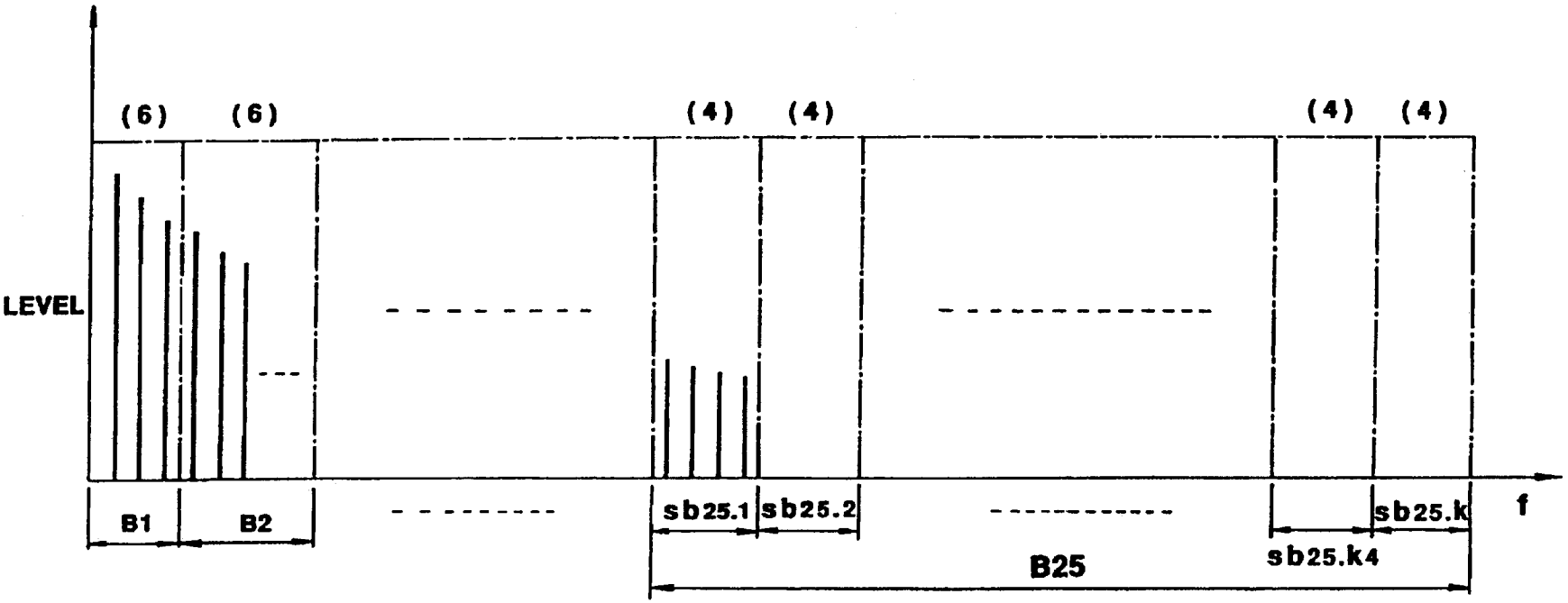
FIG. 12 is a chart for illustrating the operation of the embodiment of FIG. 11.

As shown for example in FIG. 12, a predetermined number of bits [r lesser] *r, which is less* than the predetermined number of bits c [for the lower range] *used in the lower frequency* bands, such as band $B_1$, $B_2$, . . . among the critical bands B1 to B25, [are] *is* provided to [k sub-bands $sb_{25,1}$ 1 to $sb_{25,1}$ k in a higher range] *each of the k sub-bands $sb_{25,1}$ to $sb_{25,k}$ in a higher frequency* band such as band B25, and quantization is performed with the number of bits r. The predetermined numbers of [the] bits may for example be 6 for the bands B1 and B2 and 4 for band B25, that is, four bits *for* each of the sub-bands [sb 25, 1to sb $\mathbf{25}_1$ k, as shown in brackets] *$sb_{25,1}$ to $sb_{25,k}$, as shown in parentheses* in the drawing. Although not shown, 6 bits, 5 bits and 4 bits may be provided to bands B1 to B5, B6 to B15 and bands B16 to B25, respectively. In determining the numbers of floating coefficient quantization bits, the number of [the] bits may be adjusted [with the data] *taking the signal* dispersion in the block [taken] into consideration. In this case, the numbers of allocation bits for the floating coefficients are decreased for the blocks with larger dispersion.

With the above described third embodiment, since the predetermined number of bits are provided to the [sub-bands of the high frequency range] *higher-frequency sub-bands* at the time of quantization of the floating [coefficients, it does not occur that] *coefficients* the numbers of the bits of the floating coefficients per [sample] *one of the coefficient data* in the [frequency band in the high frequency range be] *higher frequency bands is not* decreased drastically as compared to the numbers of the bits for the [low frequency range,] *lower frequency bands,* even in cases wherein the band or block width is enlarged [for the high frequency range,] *at higher frequencies,* such as in the above mentioned critical bands, so that it becomes possible to prevent the [effect] *efficiency* of the block floating [in the high frequency range] *at higher frequencies* from being lowered. On the other hand, the floating coefficients [of the higher frequency range] *at higher frequencies* are quantized with [the smaller number of the bits,] *a smaller number of bits* so that bits may be used more efficiently at [the high frequency region where the larger number of the bits in] *higher frequencies where a larger number of bits is* not required [in view] *as a result* of the human auditory characteristics.

What is claimed is:

1. A digital signal encoding method of the type in which *an* input digital [signals are] *signal is* divided into *frequency components in* a plurality of frequency bands which are so set that the *frequency* bands with higher frequencies will have broader bandwidths, and in which encoded signals are synthesized and outputted for each of the frequency bands, wherein the improvement resides in the steps of:

detecting by spectral analyses properties of the frequency components of the frequency bands, [with the period of] the spectral analyses[,] *having a* [which is the] detection time interval [or the time width as a unit of the analyses along the time axis, being] selected to be longer for lower frequencies, and generating a corresponding detection output signal; and controlling the synthesizing and encoding as a function of the detection output signal.

2. The digital signal encoding method according to claim 1, wherein the input digital [signals have] *signal has* a given sampling rate determined by a *sampling rate* clock signal, and, in the step of detecting the properties of the frequency components, [the frequency of] clock signals used in the spectral [analysis] *analyses* are derived from the sampling rate clock signal and [are] *have frequencies* selected to be lower for lower frequency bands.

3. A high efficiency digital [data] *signal* encoding method, comprising the steps of:

dividing *an* input digital [data] *signal* into a plurality of bands [so that the] *having progressive broader* band-widths thereof [will become progressively broader] for higher frequency bands;

forming a plurality of blocks, each consisting of a plurality of samples of the divided input digital [data,] *signal,* for each band; and performing *an* orthogonal transformation of each block of the bands to generate coefficient data.

4. The method according to claim 3, wherein the block in which the orthogonal transformation is performed is composed of the same [numbers of] *number* the samples [data for] *of the divided input signal in* the respective bands.

5. A high efficiency encoding method of the type in which *an* input digital [data are] signal is converted into data on [the] *a* frequency axis to produce data divided according to predetermined frequency bands, the data of the respective *frequency* bands are formed into blocks by selecting [the] band-widths *of the blocks* to be broader [for the high frequency ranges] *at higher frequencies* to compute [the] floating coefficients for the respective blocks, a floating operation [for] *on* the respective blocks is performed [with] *using* the floating coefficients, and the floating coefficients are quantized, wherein the improvement resides in that:

in the step of forming the data [of] *in* the respective *frequency* bands into blocks, the number of the data in each block [are] *is* selected to be approximately equal; and in the step of quantizing the floating coefficients, the floating coefficients [for the high frequency ranges] are quantized in such a manner that [the numbers of] *progressively fewer* bits are [progressively smaller for]

*allocated to* the floating coefficients of [the higher frequency ranges.] *the frequency bands at higher frequencies.*

6. A digital signal encoding apparatus of the type including means for dividing *an* input digital [signals] *signal* into *frequency components in* a plurality of frequency bands which are so set that the *frequency* bands with higher frequencies will have broader bandwidths, and means for synthesizing and outputting encoded signals for each of the frequency bands, wherein the improvement comprises:

means for detecting by spectral analyses properties of the frequency components of the frequency bands, [with the period of] the spectral analyses[, which is the] *having a* detection time interval [or the time width as a unit of the analyses along the time axis, being] selected to be longer for lower frequencies, and generating a corresponding detection output signal; and means for controlling the synthesizing and encoding as a function of the detection output signal.

7. The digital signal encoding apparatus according to claim 6, wherein the input digital signals have a given sampling rate determined by a *sampling rate* clock signal, and the means for detecting includes means for deriving, [clock signals] from the sampling rate clock signal [and the frequency of these] *clock signals for use in the spectral analyses, the* clock signals [used in the spectral analysis are] *having frequencies* selected to be lower for lower frequency bands.

8. A high efficiency digital [data] *signal* encoding apparatus, comprising:

means for dividing *an* input digital [data] *signal* into a plurality of bands [so that the] *having progressive broader* bandwidths [thereof will become progressively broader] for higher frequency bands;

means for forming a plurality of blocks, each consisting of a plurality of samples of the divided input digital [data,] *signal,* for each band; and means for performing *an* orthogonal transformation of each block of the bands to generate coefficient data.

9. The apparatus according to claim 8, wherein the block in which the orthogonal transformation is performed is composed of the same [numbers] *number* of the [sample data for] *samples of the divided input digital signal in* the respective bands.

10. A high efficiency encoding apparatus of the type which includes means for converting *an* input digital [data] *signal* into data on [the] *a* frequency axis to produce data divided according to predetermined frequency bands, means for forming the data [of] *in* the respective *frequency* bands into blocks by selecting [the] bandwidths *of the blocks* to be broader [for the high frequency ranges] *at higher frequencies* to compute [the] floating coefficients for the respective blocks, means for performing a floating operation [for] *on* the respective blocks [with] *using* the floating coefficients, and means for quantizing the floating coefficients, wherein the improvement [comprises:] *resides in that:*

[that] the means for forming the data [of] *in* the respective bands into blocks selects the number of the data in each block to be approximately equal; and the means for quantizing the floating coefficients quantizes the floating coefficients [for the high frequency ranges] in such a manner that [the numbers of] *progressively fewer* bits are [progressively smaller for] *allocated to* the floating coefficients of the [higher frequency ranges.] *frequency bands at higher frequencies.*

11. A digital signal encoding method of the type in which *an* input digital [signals are] *signal is* divided into *frequency components in* a plurality of frequency bands which are so set that the frequency bands with higher frequencies will have broader bandwidths, and in which encoded signals are synthesized and outputted for each of the frequency bands, wherein the improvement resides in the steps of:

detecting properties of the frequency components [of] *in* the frequency bands, [with the time duration of] this detection of the properties of the frequency components [being] *having a time duration* selected to be longer for lower frequencies, and generating a corresponding detection output signal, wherein the step of detecting the properties of the frequency components includes a spectrum analysis step, and wherein [the frequency of] clock signals used in the spectral analysis step [is] *have frequencies* selected to be lower for *the* clock signals for [lower] *the* frequency bands *with lower frequencies*; and controlling the synthesizing and encoding as a function of the detection output signal.

12. A digital signal encoding apparatus of the type including means for dividing *an* input digital [signals] *signal* into *frequency components* a plurality of frequency bands which are so set that the *frequency* bands with higher frequencies will have broader bandwidths, and means for synthesizing and outputting encoded signals for each of the frequency bands, wherein the improvement comprises:

means for detecting properties of the frequency components [of] *in* the frequency bands, [with the time duration of] this detection of the frequency components [being] *having a time duration* selected to be longer for lower frequencies, and generating a corresponding detection output signal, wherein the means for detecting the properties of the frequency components includes a spectrum analysis means, and wherein [the frequency of] clock signals used in the spectral analysis means [is] *have frequencies* selected to be lower for the clock signals for [lower] *the* frequency bands *with lower frequencies*; and means for controlling the synthesizing and encoding as a function of the detection output signal.

*13. A digital signal encoding method for encoding an input digital signal, the method comprising the steps of:*

*dividing the input digital signal into frequency components in a plurality of frequency bands;*

*synthesizing and outputting encoded signals for each of the frequency bands;*

*detecting by spectral analyses properties of the frequency components in the frequency bands, and generating a corresponding detection output signal; and*

*controlling the synthesizing of the encoded signals as a function of the detection output signal.*

*14. The digital signal encoding method according to claim 13, wherein:*

*in the step of dividing the input digital signal into a plurality of frequency bands, the input digital signal is divided into frequency bands having broader bandwidths at higher frequencies; and*

*in the step of detecting properties of the frequency components, the spectral analyses have a detection time selected according to the bandwidth of the respective frequency band.*

*15. The digital signal encoding method according to claim 14, wherein:*

*the input digital signal has a given sampling rate determined by a sampling-rate clock signal; and*

*the step of detecting properties of the frequency components includes the step of deriving, from the sampling-rate clock signal, clock signals for use in the spectral analyses.*

*16. The digital signal encoding method according to claim 15, wherein, in the step of deriving clock signals for use in the spectral analyses, the clock signals have frequencies selected according to the bandwidth of the respective frequency band.*

*17. The digital signal encoding method according to claim 15, wherein, in the step of detecting by spectral analyses, the spectral analyses have a detection time selected according to the bandwidth of the respective frequency band.*

*18. The digital signal encoding method according to claim 13, wherein, in the step of dividing the input digital signals into a plurality of frequency bands, the input digital signal is divided into least two frequency bands having equal bandwidths.*

*19. A digital signal encoding method for encoding an input digital signal, the method comprising the steps of:*

*dividing the input digital signal into a plurality of frequency bands;*

*forming a plurality of blocks, each consisting of a plurality of samples of the divided input digital signal, for each frequency band; and*

*performing an orthogonal transformation of each block of the frequency bands to generate coefficient data.*

*20. The digital signal encoding method according to claim 19, wherein the method additionally comprises the ste p of dividing the coefficient data into predetermined frequency blocks having broader bandwidths at higher frequencies.*

*21. The digital signal encoding method according to claim 19, wherein, the step of forming a plurality of blocks forms, in one of the frequency bands, blocks consisting of samples equal in number to the samples in the blocks in at least one other of the frequency bands.*

*22. The digital signal encoding method according to claim 19, wherein, in the step of dividing the input digital signal into a plurality of frequency bands, frequency bands with higher frequencies have broader bandwidths.*

*23. The digital signal encoding method according to claim 19, wherein, in the step of dividing the input digital signal into a plurality of frequency bands, at least two of the frequency bands have equal bandwidths.*

*24. A digital signal encoding method for an input digital signal, the method comprising the steps of:*

*converting the input digital signal into coefficient data on a frequency axis;*

*dividing the coefficient data into predetermined frequency bands;*

*forming the coefficient data in the respective frequency bands into blocks of approximately equal numbers of coefficient data;*

*computing a floating coefficient for the each of the blocks;*

*performing a floating operation on each of the blocks using the respective floating coefficient; and*

*quantizing the floating coefficients in a manner that allocates progressively fewer quantizing bits to the floating coefficients of the frequency bands at higher frequencies.*

*25. The digital signal encoding method according to claim 24, wherein the step for dividing the coefficient data into predetermined frequency bands divides the coefficient data into predetermined frequency bands having broader bandwidths at hither frequencies.*

*26. The digital signal encoding method according to claim 24, wherein, in the step of forming the coefficient data into blocks, more than one block is formed in a frequency band at a higher frequency.*

*27. A digital signal encoding an apparatus, comprising:*

*frequency dividing means for dividing an input digital signal into frequency components in a plurality of frequency bands;*

*means for synthesizing and outputting encoded signals for each of the frequency bands;*

*means for detecting by spectral analyses properties of the frequency components in the frequency bands, and for generating a corresponding detection output signal; and*

*means for controlling the means for synthesizing and outputting encoded signals as a function of the detection output signal.*

*28. The digital signal encoding apparatus according to claim 27, wherein:*

*the frequency dividing means divides the digital input signal into frequency bands having broader bandwidths at higher frequencies; and* the means for detecting detects by spectral analyses having a detection time selected according to the bandwidth of the respective frequency band.

*29. The digital signal encoding apparatus according to claim 27, wherein:*

*the input digital signal has a given sampling rate determined by a sampling-rate clock signal; and*

*the means for detecting includes means for deriving, from the sampling-rate clock signal, clock signals for use in the spectral analyses.*

*30. The digital signal encoding apparatus according to claim 29, wherein the means for deriving clock signals for use in the spectral analyses includes means for selecting frequencies for the clock signals according to the bandwidth of the respective frequency band.*

*31. The digital signal encoding apparatus according to claim 29, wherein the means for detecting detects by spectral analyses having a detection time selected according to the bandwidth of the respective frequency band.*

*32. The digital signal encoding apparatus according to claim 27, wherein the frequency dividing means divides the input digital signal into frequency bands in such a manner that two of the frequency bands have equal bandwidths.*

*33. A digital signal encoding apparatus, comprising:*

*means for dividing an input digital signal into a plurality of frequency bands;*

*means for forming a plurality of blocks, each consisting of a plurality of samples of the divided input digital signal, in each frequency band; and*

*means for performing an orthogonal transformation of each block in each of the frequency bands to generate coefficient data.*

*34. The digital signal encoding apparatus according to claim 33, wherein the means for forming a plurality of blocks forms, in one of the frequency bands, blocks consisting of samples equal in number to the samples in the blocks in at least one other of the frequency bands.*

*35. The digital signal encoding apparatus according to claim 33, wherein the means for dividing the input digital signal into a plurality of frequency bands divides the input*

*digital signal into frequency bands having broader bandwidths at higher frequencies.*

*36. The digital signal encoding apparatus according to claim 33, wherein the means for dividing the input digital signal into a plurality of frequency bands divides the input digital signal into frequency bands, at least two of the frequency bands having equal bandwidths.*

*37. A digital signal encoding apparatus, comprising:*

*means for converting an input digital signal into coefficient data on a frequency axis;*

*means for dividing the coefficient data into predetermined frequency bands;*

*means for forming the coefficient data in the respective bands into blocks, the numbers of coefficient data in the blocks being selected to be approximately equal;*

*means for computing a floating coefficient for each of the blocks;*

*means for performing a floating operation on each of the blocks using the respective floating coefficient, and*

*means for quantizing the floating coefficients in a manner that allocates progressively fewer quantizing bits to the floating coefficients of frequency bands at the higher frequencies.*

*38. The digital signal encoding apparatus according to claim 37, wherein the means for dividing the coefficient data into predetermined frequency bands divides the coefficient data into predetermined frequency bands having broader bandwidths at higher frequencies.*

*39. The digital signal encoding apparatus according to claim 37, wherein the means for forming the coefficient data into blocks forms more than one block in a frequency band at a higher frequency.*

*40. A digital signal encoding apparatus for encoding an input digital signal, the apparatus comprising:*

*means for orthogonally transforming the input digital signal to provide data on a frequency axis; and*

*means for dividing the data into frequency bands having broader bandwidths at higher frequencies.*

*41. The digital signal encoding apparatus according to claim 40, wherein the means for dividing divides the data into frequency bands corresponding to critical bands.*

*42. The digital signal encoding apparatus according to claim 40, additionally comprising:*

*block forming means for forming the data in the frequency bands into blocks of approximately equal numbers of data, and*

*means for applying block floating to each block of data.*

*43. The digital signal encoding ap paratus of claim 42, wherein the block forming means includes means for dividing the data in a frequency band into plural blocks, each block corresponding to a sub band obtained by dividing the frequency band in frequency.*

*44. A digital signal encoding method for encoding an input digital signal, the method comprising the steps of:*

*orthogonally transforming the input digital signal to provide data on a frequency axis; and*

*dividing the data into frequency bands having broader bandwidths at higher frequencies.*

*45. The digital signal encoding method according to claim 44, wherein the step of dividing the data into frequency bands divides the data into frequency bands corresponding to critical bands.*

*46. The digital signal encoding method according to claim 44, additionally comprising the steps of:*

*forming the data in the frequency bands into blocks of approximately equal numbers of data, and*

*applying block floating to each block of data.*

*47. The digital signal encoding method according to claim 46, wherein the step of forming the data into blocks includes the step of dividing the data in a high frequency band into plural blocks, each block corresponding to a sub band obtained by dividing the high frequency band in frequency.*

* * * * *